United States Patent [19]

Martin

[11] Patent Number: 5,095,822
[45] Date of Patent: Mar. 17, 1992

[54] CABLE CROSSOVER DEVICE

[75] Inventor: Andrew T. Martin, Rolling Hills Estates, Calif.

[73] Assignee: Trouper Industries, Ltd., Gardena, Calif.

[21] Appl. No.: 570,163

[22] Filed: Aug. 20, 1990

[51] Int. Cl.⁵ .......................... E01B 7/28; H02G 9/04
[52] U.S. Cl. ...................................... 104/275; 174/97; 174/101
[58] Field of Search ............ 174/70 C, 72 C, 97, 174/101; 104/275; 138/117; 14/1, 2.4, 69.5; 404/35, 71

[56] References Cited

U.S. PATENT DOCUMENTS

| | | | |
|---|---|---|---|
| 585,540 | 6/1897 | Spangler | 104/275 |
| 1,914,830 | 6/1933 | Kostohris | 104/275 |
| 2,299,356 | 10/1942 | Strohm et al. | 104/275 |
| 3,888,186 | 6/1975 | Jentzsch et al. | 104/275 |
| 3,965,967 | 6/1976 | Jentzsch et al. | 104/275 |

*Primary Examiner*—Laramie E. Askin
*Attorney, Agent, or Firm*—Irving Keschner

[57] ABSTRACT

An improved cable crossover device for protecting electrical cables from damage. The device is modular in design and comprises modular sections coupled together by a strengthened interlocking system which allows for a variable length device. The main modular section comprises a solid body of elastomeric material comprising two opposed ramps. Each ramp comprises a bottom, generally horizontal surface and an inclined surface extending upwardly from the bottom surface at an angle. Each ramp merges with a central portion of the crossover device comprising a horizontal surface between which is located a plurality of U-shaped recesses, each recess comprising spaced vertical walls and a horizontal base wall therebetween. The electrical cables are positioned within the recesses, each recess being dimensioned so that more than one cable can be supported therein. A hinged lid of a width sufficient to cover each of the recesses is provided to both protect the cables from damage and to assume part of the load which passes over the crossover device, the non-hinged end of the lid being secured to the device by a Velcro system (i.e. loops or hooks).

1 Claim, 2 Drawing Sheets

CABLE CROSSOVER DEVICE

BACKGROUND OF THE INVENTION

1. Field of the Invention

The present invention relates to a device which protects electrical cables from damage and, in particular, to a modular cable crossover device which has multiple, large area cable recesses.

2. Description of the Prior Art

The need to protect electrical cables, utility lines, etc. exposed to vehicular or pedestrian traffic on streets, sidewalks, or other places has been recognized in the prior art.

For example, U.S. Pat. No. 2,299,356 to Strohm et al. discloses a utility crossover device which comprises a mat composed of resilient material, such as rubber. One side of the pad is provided with a plurality of longitudinal slots for carrying utility lines such as cables, pipes, hose, etc. The pads are formed in sections adapted to be handled by one person and are arranged to be placed adjacent each other to form a crossover of any desired extent. Ramp portions are formed on the outermost edges of the crossover device. Although the Strohm et al. device has advantages associated therewith, one of the disadvantages associated therewith is that the rubber material is relatively heavy and compressible and thus unable to support relatively heavy loads. In addition, the device is relatively expensive and bulky in size.

U.S. Pat. Nos. 3,888,186 and 3,965,967 to Jentzsch et al. disclose a portable crossover device made of high strength elastomeric material which includes a single U-shaped channel or recess and a stripped insert of elastomeric material placed over the cable to prevent debris from damaging the cable. The crossover has ramps on each side thereof to engage a vehicle.

Cable crossover devices sold by Peterson Systems International, Salt Lake City, Utah, under the trademark Hiperthane comprises models having four or five cable channels, an interlocking system for joining device sections and apertures for storing gripping handles. Although the Hiperthane crossover devices perform well, there are disadvantages associated with their use. For example, the interlock system used is not strong enough to both prevent failure after extended use and flexing between adjacent modular sections. In addition, the cable channels are relatively small in area, therefore limiting the size and/or number of the cables which can be protected. Further, the surfaces of the ramp portions are relatively slick or slippery, therefore providing a poor gripping surface for the vehicles or other pieces of equipment which have to traverse the crossover. Also, the handle aperture covers tend to become lost or not used, increasing the risk that a person's shoe heel, for example, could be caught in the aperture, causing the person to be injured. Finally, the lid, or cover, protecting the cable recesses is difficult to open to gain access to the recesses.

It should be noted at this point that the device described above is utilized in various industries and different names have become associated with the same device. For example, in the entertainment and electrical industries, the term utilized is "cable crossover". In the lighting and staging industries, the term "cable bridges" is utilized. Sound companies, on the other hand, use the term "cable ramps".

What is therefore desired is to provide a crossover device for protecting cables which is relatively inexpensive, wherein the modular portions lock together relatively easily to decrease the flexing between modular sections, wherein the cable recesses have an area to enclose larger sized cables or more than one cable and wherein the device lid is easily opened to allow access to the cable recesses and is permanently secured to the device and will fasten down in the closed position.

SUMMARY OF THE PRESENT INVENTION

The present invention provides an improved cable crossover device for protecting electrical cables from damage, the device being modular in design and comprising modular sections coupled together by a strengthened interlocking system which allows for a variable length device. The main modular section comprises a solid body of elastomeric material comprising two opposed ramps. Each ramp comprises a bottom, generally horizontal surface and an inclined surface extending upwardly from the bottom surface at an angle. Each ramp merges with a central portion of the crossover device comprising a horizontal surface between which is located a plurality of U-shaped recesses, each recess comprising spaced vertical walls and a horizontal base wall therebetween. The electrical cables are positioned within the recesses, each recess being dimensioned so that more than one cable can be supported therein. A hinged lid of a width sufficient to cover each of the recesses is provided to both protect the cables from damage and to assume part of the load which passes over the crossover device, the non-hinged end of the lid being secured to the device by a Velcro system.

DESCRIPTION OF THE DRAWINGS

For a better understanding of the invention as well as other objects and further features thereof, reference is made to the following description which is to be read in conjunction with the accompanying drawing wherein.

DESCRIPTION OF THE INVENTION

Figure 1:
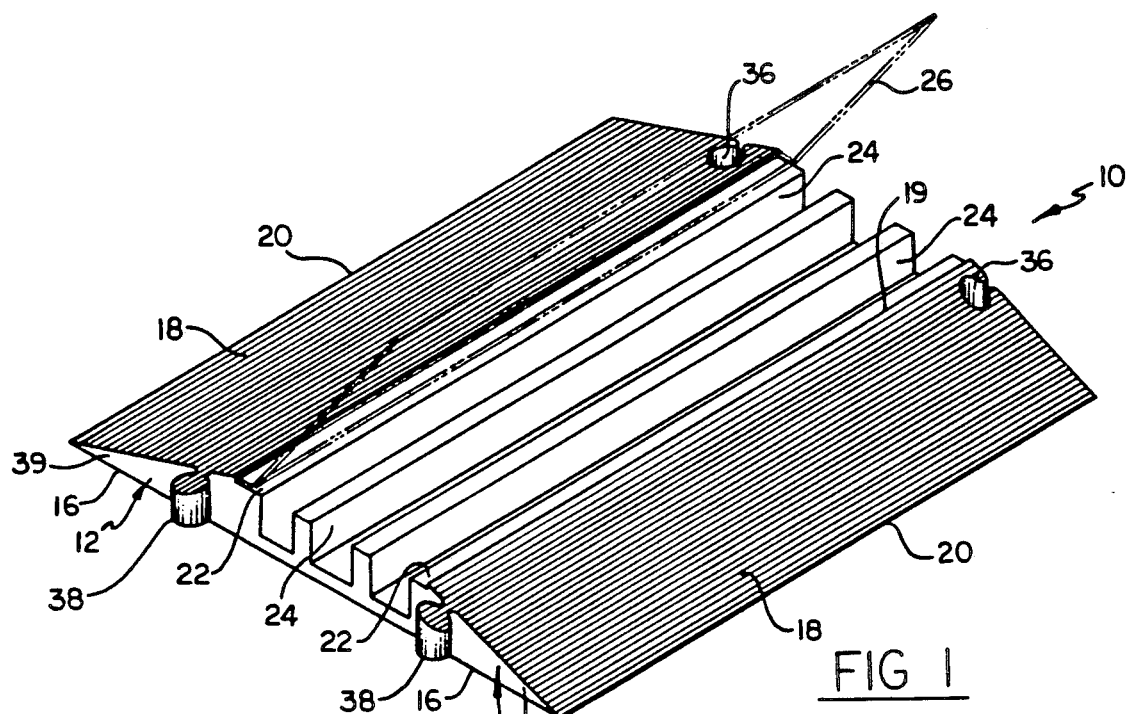
FIG. 1 is a perspective view of the crossover device of the present invention.

Referring now to the Figures, each modular section 10 of the crossover device (the use of the term "crossover device" is meant to encompass the other terms used to describe the same device) of the present invention comprises a solid unitary body of elastomeric material and has opposed ramps 12 and 14. Each ramp comprise a bottom generally horizontal surface portion 16 (both portions 16 form a single, continuous bottom surface) and a surface 18 which is inclined upwardly from opposed edges 20.

Figure 1A:
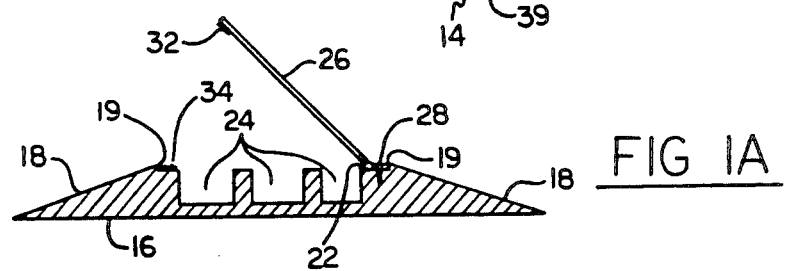
FIG. 1A is a simplified view illustrating the construction of the lid used to cover the cable recesses.
Figure 2:
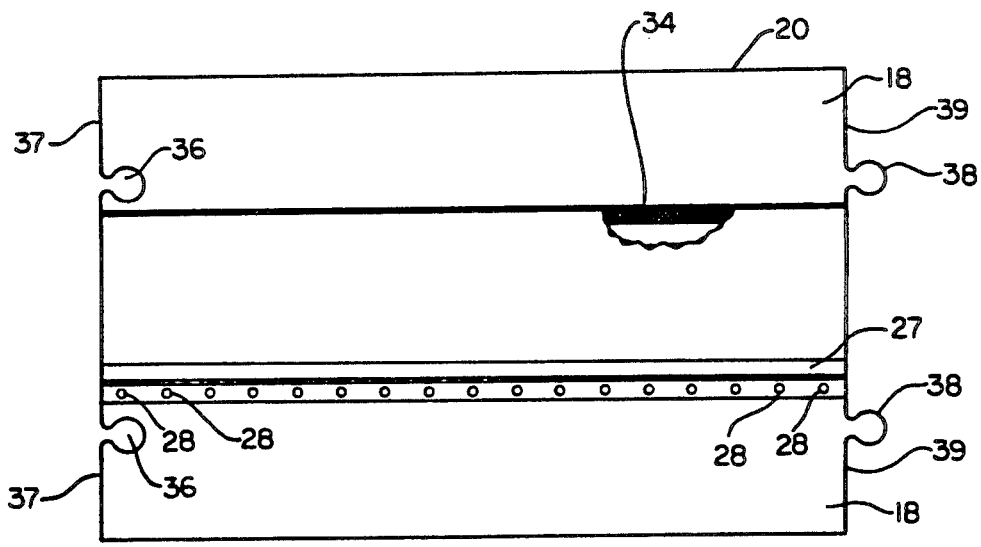
FIG. 2 is a top view of the crossover device shown in FIG. 1 with a cutaway portion.

One edge 19 of each ramp 12 and 14 merges with a central portion of the crossover device comprising a top horizontal surface or shoulder 22 between which are located a plurality of U-shaped channels, or recesses, 24. Each recess is a channel comprised of spaced vertical walls and a horizontal base wall therebetween. Electrical cables are situated within the recesses and rest upon the base wall thereof. The top surfaces of the cables are sufficiently low in each recess such that a lid, or cover, 26 (shown as being transparent in FIG. 1 for purposes of clarity although lid 26 is preferably made of an opaque, plastic material) having a width slightly greater than the width of the recesses positioned above the recesses manages to cover the cables therein. The lid 26 provides two functions, i.e. preventing debris from accumulating on top of the cables which otherwise would damage the cables and assuming part of the load (along with the two ramps and two shoulders), when contacted by loads, such as vehicle wheels. As shown more clearly in FIGS. 1A and 2, lid 26 is permanently secured at one end to shoulder 22 by a plurality of rivets 28 (other fastening devices can be used, such as adhesive) and pivots, or is hinged, about a lengthwise groove 27 formed therein. In order to retain the lid 26 in the closed position, one component 32 of a Velcro fastener system (i.e., hooks or loops) is affixed to the bottom surface at the far end of the lid. The coupling component 34 of the Velcro system (i.e., loops or hooks) is affixed to the other shoulder 22 of device 10 as illustrated. This attachment arrangement allows the lid 26 to be opened or closed as necessary.

Figure 3C:
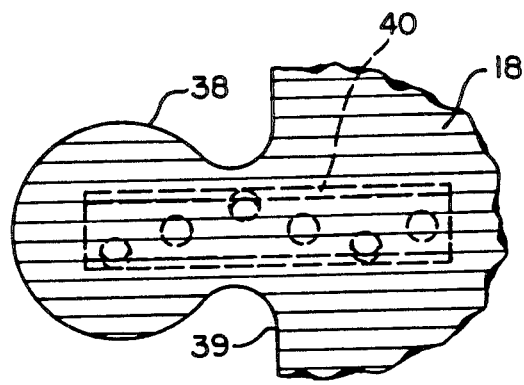
FIGS. 3(a), 3(b) and 3(c) are front, side and top views, respectively, of the male interlocking mechanism, the figures illustrating the internal position of a reinforcing tube insert.
Figure 3A:
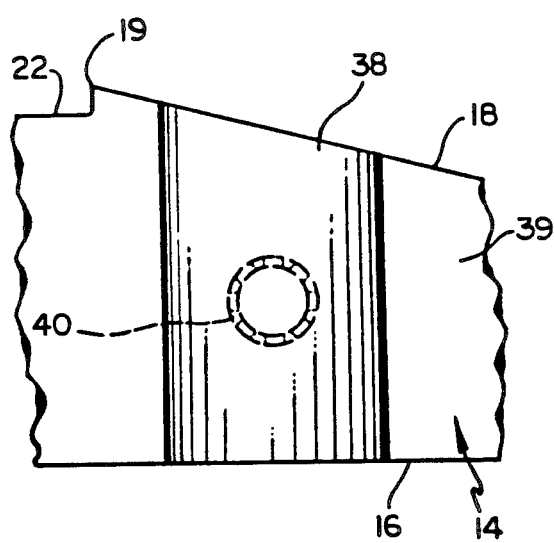
Figure 3B:
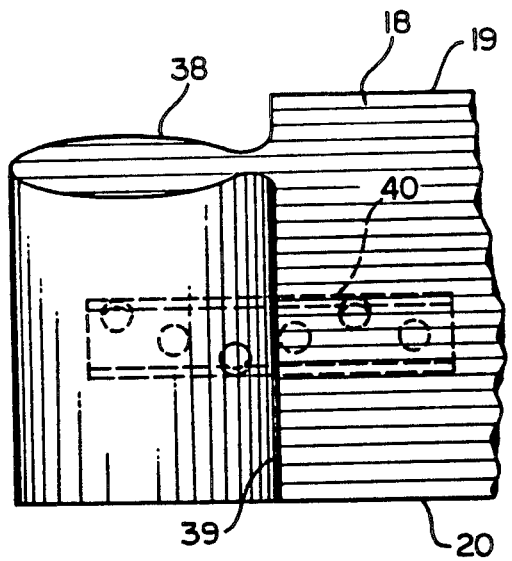

The female portions 36 of the interlocking mechanism of the present invention are formed on the rear surface 37 of ramps 12 and 14 and the corresponding male portions 38 of the interlocking mechanism extend from the front surface 39 of ramps 12 and 14 as illustrated. The male portions 38 of the interlocking mechanism are strengthened (reinforced) by imbedding a perforated metal tube 40 in the position illustrated in FIGS. 3(a) through 3(c). Preferably, tubing 40 is made of aluminum, is approximately ½" in diameter and 4" in length. Reinforcing the male portions 38 enables the interlocking system to be long lived, makes the interconnection joint secure and decreases the possibility that the adjacent modular sections would flex under substantial loads.

The tapered surface 18 of each ramp portion is textured, as illustrated, thus allowing the surfaces to grip wheels, shoes, etc. which pass thereover.

The present invention thus provides a crossover device which has modular sections easily joinable together, which weighs less than prior art devices, wherein the sizes of the cable recesses are sufficient to hold large diameter cables or a plurality of small diameter cables, wherein the lid covering the cable recesses is permanently secured to the device at one end, the other end being removably secured to the device in a simple and effective manner and wherein the interlocking system is strengthened by the use of reinforcing tubing extending from inside the male interlocking member into the ramp portion of device 10, features which provide significant advantages over prior art crossover devices.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A device for shielding electrical cables from damage comprising:

a unitary, solid one piece body having a bottom surface with first and second edges, first and second portions having inclined upper surfaces each extending upwardly from said first and second edges, respectively, at an angle, each inclined upper surface having a second edge, a plurality of U-shaped recesses connecting the second edges of said inclined upper surfaces, the U-shaped recesses extending the full length of the body for receiving at least one electrical cable therein, each of said first and second portions comprising front and rear side surfaces substantially orthogonal to said bottom surface, an interlocking member extending outwardly from each of said front side surfaces, an interlocking recess being formed in each of said rear side surfaces;

a lid extending between said second edge of said first portion inclined upper surface and the second edge of said second portion inclined upper surface to cover said recesses; the end of said lid adjacent said second edge of said first portion inclined upper surface being fixedly secured to said body;

attachment means for removably connecting the end of said lid adjacent the second edge of said second portion inclined upper surface to said body; and tubular metal members for reinforcing each of said interlocking members and having a length such that they extend within said interlocking members and into an adjacent front side surface of said body.

* * * * *